May 13, 1952 C. C. WHITE 2,596,316
REFRIGERATOR
Filed Dec. 19, 1945 4 Sheets-Sheet 1

INVENTOR.
Charles C. White
BY
Albert M. Parker
ATTORNEY.

May 13, 1952  C. C. WHITE  2,596,316
REFRIGERATOR
Filed Dec. 19, 1945   4 Sheets-Sheet 2
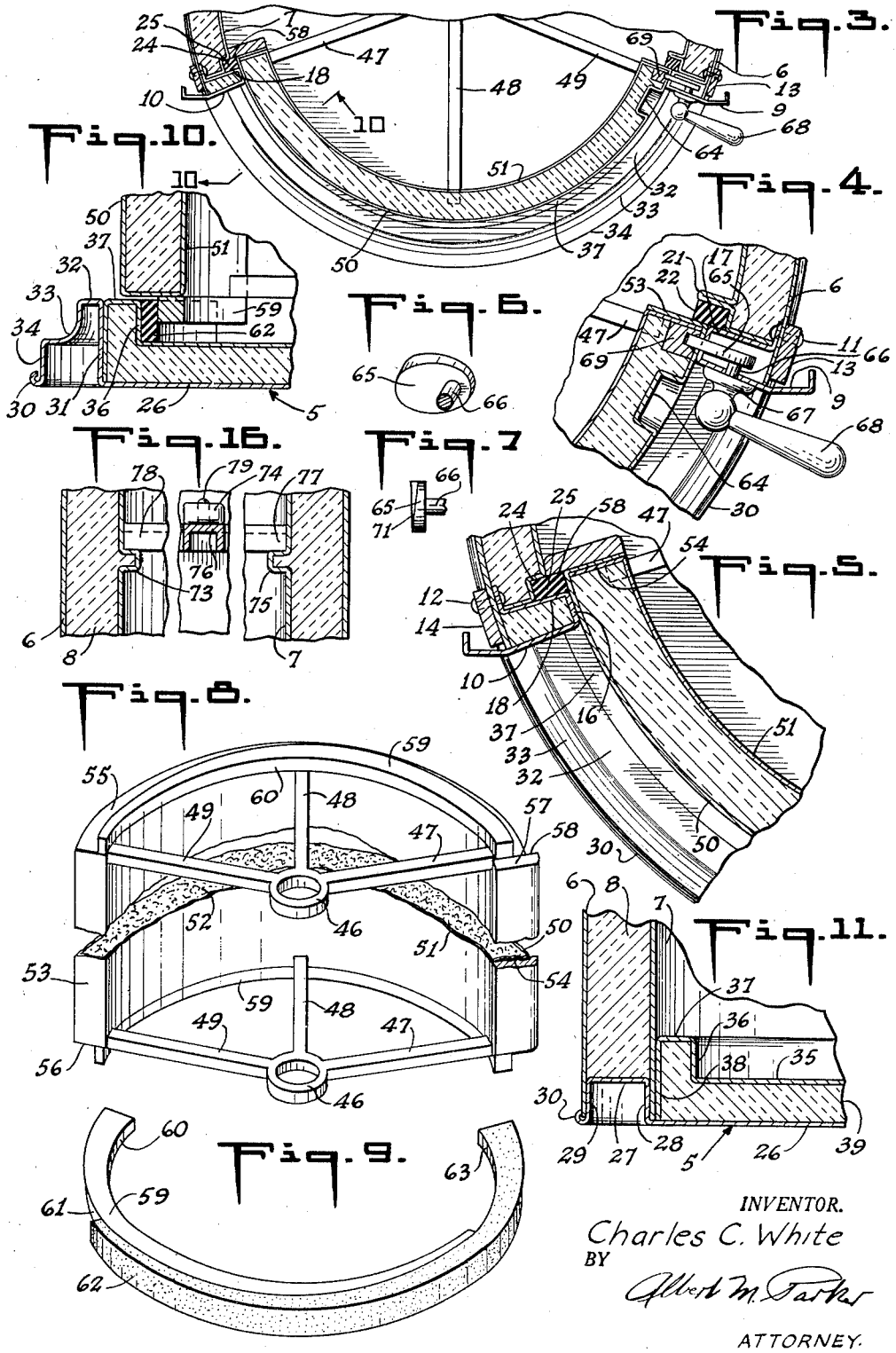
INVENTOR.
Charles C. White
BY
Albert M. Parker
ATTORNEY.

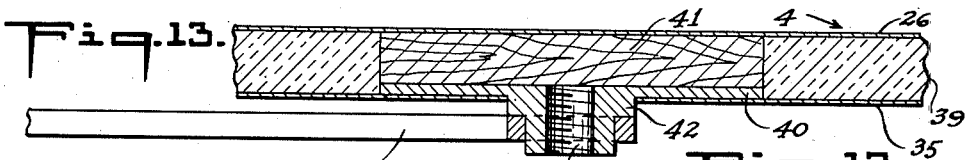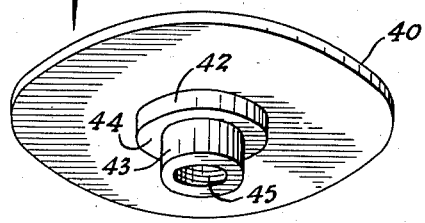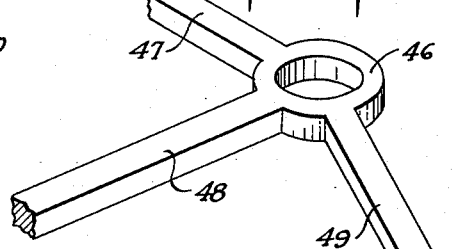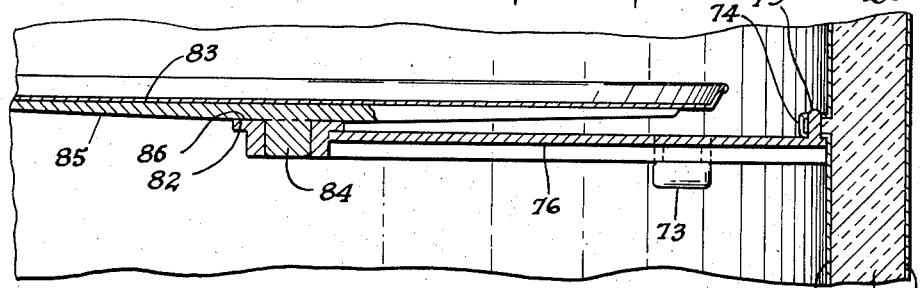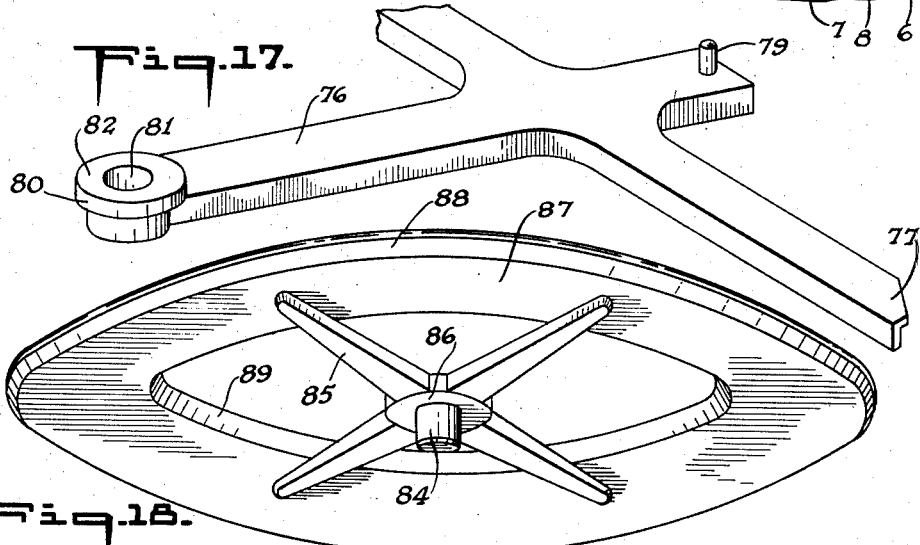

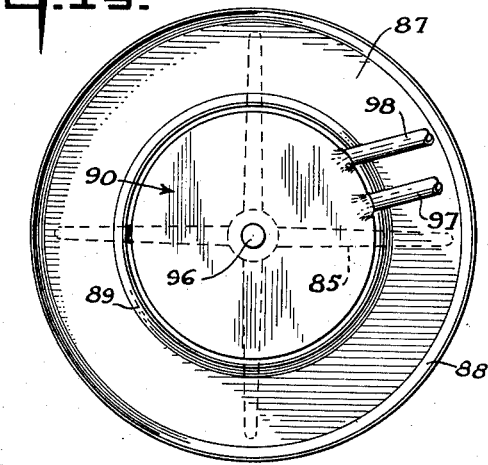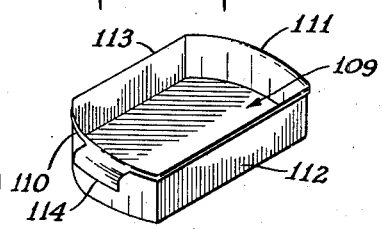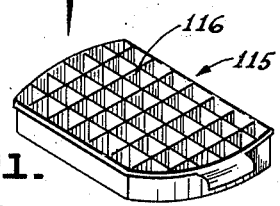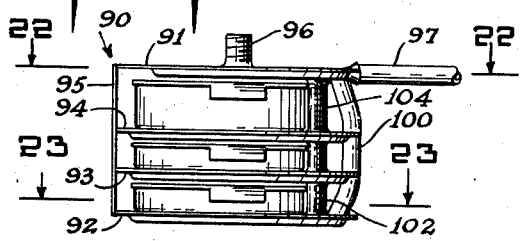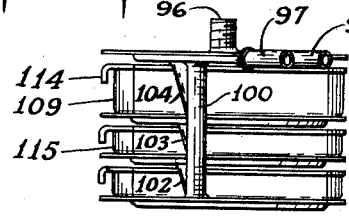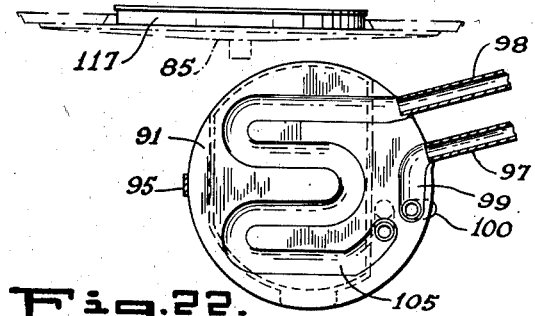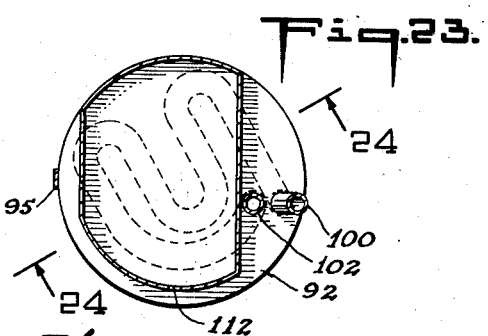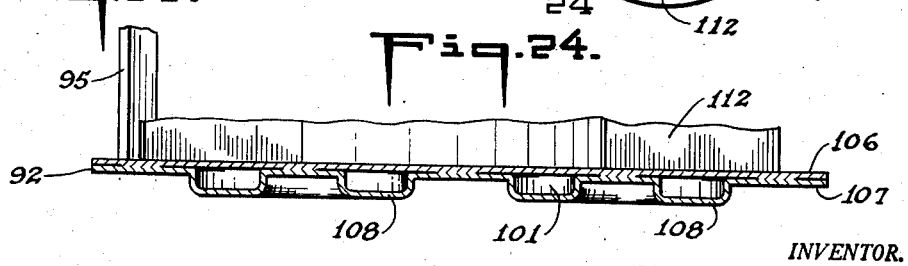
May 13, 1952     C. C. WHITE     2,596,316
REFRIGERATOR
Filed Dec. 19, 1945     4 Sheets-Sheet 4
INVENTOR.
Charles C. White
BY
ATTORNEY.

Patented May 13, 1952

2,596,316

UNITED STATES PATENT OFFICE 2,596,316

REFRIGERATOR

Charles C. White, New York, N. Y., assignor to White Cabinet Corporation, New York, N. Y., a corporation of New York Application December 19, 1945, Serial No. 636,004

2 Claims. (Cl. 220—9)

This invention relates to insulated cabinet constructions, and more particularly to such constructions to be utilized as refrigerators.

It has heretofore been more or less the general practice, in designing domestic refrigerators, to consider the refrigerator by itself without any particular relationship to the rest of the cabinet units in a kitchen, pantry, or the like. Thus, the refrigerator stands out by itself, and often spoils the symmetry of a well planned kitchen. For modern homes, apartments, etc. the refrigerator should have its bulk kept down to a minimum so as to take up as little space as possible in the kitchen or pantry, and to possibly fit in small available spaces. In addition, the design should consider such factors as ready accessibility of the contents, flexibility of interior arrangements, and utilization of all of the interior space. Furthermore, the desirable door for a refrigerator is one that will readily close tightly and provide an effective seal, without having to slam it. Finally, the facilitating of cleaning is another important factor to keep in mind.

In spite of the knowledge that the above factors were to be sought after, little was done towards realizing them in the prior art refrigerators. The boxes themselves were bulky, with about the only real consideration as to limitation of that bulk being the realization that the box would need to be moved through an ordinary door in order to install it in a house. The doors, in particular, were heavy and wide, requiring that the refrigerator be located in a place where there was ample space in front of it in order to let the door swing all the way open. Furthermore, though it was easy to open such doors, the closing was not always so easy. In order to furnish a tight and uniform seal around them, relatively thick gasketing had to be provided. To compress such gaskets, one needed to slam the doors, often requiring several tries before they caught, with resultant wear and the possibility of upsetting commodities inside of the box.

Though various shelf or tray arrangements have been tried, they were, as a general thing, all variations of the ordinary rectangular shelf of sufficient depth to render commodities stored in the back thereof relatively inaccessible. To get at the commodities in the rear, one needed either to remove the things on the front part of the shelf, or take the chance of spilling them. Such shelves were normally supported so that they could be removed and re-inserted either at a higher or lower level, but such adjustment normally served to waste most of the space above the shelf if it were set down a peg, and cramp the space between it and the shelf below it; or, vice versa, if the adjustment was upward. Regardless of such adjustment, however, one had to bend or kneel down to see what was in the back of the shelf.

A few prior art attempts were made to furnish refrigerators of cylindrical form, or in a form aproaching the cylindrical, but these were either too cumbersome, too wasteful of interior space, too hard to clean, or had other defects which rendered them undesirable from the householder's point of view. They thus failed to find public acceptance as solutions to the prior art defects.

The refrigerator of my invention eliminates practically all of the drawbacks just discussed and, in addition, incorporates other improvements in refrigerator construction not heretofore contemplated. Not only is the actual bulk of the refrigerator kept down, but the space needed to operate it is greatly reduced. The latter is effected by the employment of a concentric door turning inside of a cylindrical body rather than swinging out into the room, as a hinged door would do. Next, the contents of all the shelves, including the bottle shelf or rack around the evaporator, are all immediately available by a mere turning of them. In fact, more space is provided for bottles than has heretofore been the case. This is accomplished by making the evaporator cylindrical, mounting it on the axis of the walls, but spaced therefrom, and rotatably mounting the bottle shelf, of annular form, beneath the evaporator and across the space between it and wall. Thus, bottles and other articles on the bottle shelf can rotate all the way around the evaporator. All the shelves are adjustable as to height, and anything on them can be quickly located by merely rotating them. This eliminates having to stoop or kneel down to look into the back of the cabinet. In addition, the rotatableness of the shelves eliminates the necessity of removing things from the front of any shelf in order to get at something in the rear of it. Spilling is thus greatly reduced.

When the time comes to clean the interior of the refrigerator, one finds that the shelves, with all the contents thereon, can be removed by merely lifting them out of their pivotal mountings. Cleaning is also facilitated by the fact that the projections into the interior of the refrigerator, for shelf supports and the like, are reduced to a minimum. Even the evaporator is hung from a single point mounting as will appear hereinafter.

To eliminate previous difficulties with doors, I have devised one which is normally easily closed and opened by a simple turning action. Its gaskets are engaged in the course of that action rather than by any slamming of the door. In addition to a simple hand closing, I have provided a clamping system to effect an additional closing and compression of the gaskets. This is normally only to be employed when one is through with the immediate use of the box. In other words, while a meal is in the process of preparation, and afterwards, while the remaining food is being stowed away in the refrigerator, the door need only be closed by turning or swinging it by hand. On completion of the stowing, however, an extremely tight seal can be effected by employing the clamping means.

All of my improvements are accomplished while nevertheless presenting a refrigerator construction which has many interchangeable parts, and is easy to assemble. In addition, it can either be used alone or incorporated in a cabinet assembly, as one of the units thereof. The manner in which such can be done is disclosed in my co-pending patent application Serial Number 593,411, filed May 12, 1945, entitled "Cabinet Assemblies," now Patent No. 2,521,765. Though for the sake of convenience I am describing my invention as applied to domestic refrigeration it is, of course, to be understood that such description is to be taken in an illustrative rather than a limiting sense.

It is accordingly an object of my invention to provide a refrigerator which occupies a minimum of space, but furnishes a maximum of storage space.

Another object of the invention is to provide a refrigerator, wherein means is provided to render the contents thereof extremely accessible.

A further object of the invention is to provide a refrigerator with an unobtrusive door which closes easily and can be drawn up tightly to seal it.

A still further object of the invention is to provide effective and easily replaceable door gasketing for a refrigerator.

Still further objects of the invention concern the fabrication of a refrigerator in a simple and economical manner, and the demountable arrangement of the elements thereof to facilitate handling and cleaning.

Further and more detailed objects of the invention will appear hereinafter as the description proceeds, and by reference to the accompanying drawing, in which:

Figure 3 is a fragmentary horizontal section through the door and part of the wall thereof, with the shelves removed, and showing the door in fully closed position;

Figure 4 is an enlarged fragmentary section of the right hand side of the door opening as seen in Figure 3;

Figure 5 is an enlarged fragmentary section of the left hand side of the door opening as seen in Figure 3;

Figure 6 is a perspective view of the clamping element employed for drawing the door up tight against its gaskets;

Figure 7 is an end elevation of the same, looking at the left end thereof as seen in Figure 6;

Figure 8 is an inside perspective view of the door of my cabinet with a fragment thereof removed to show the interior construction of the door;

Figure 9 is a perspective view of the elements employed for gasketing the top and bottom of the door;

Figure 10 is a fragmentary vertical section taken on the lines 10—10 of Figure 3, and showing the manner in which the gasket elements come together;

Figure 11 is an enlarged fragmentary vertical section taken on lines 11—11 of Figure 2, showing the manner in which the side and bottom members come together at that position;

Figure 12 is a fragmentary perspective of one of the pivotal mounting members, with portions of the spider of supporting arms for the door extending therefrom;

Figure 13 is a fragmentary vertical section of that portion of an end of the cabinet which carries the pivotal receiving member for the door and shows the mounting member of the door, and shows one of the mounting spiders for the door engaged therewith;

Figure 14 is a perspective view of the plate carrying the receiving member employed in Figure 13;

Figure 15 is a fragmentary vertical section of the cabinet wall, a shelf, and a shelf supporting arm showing the manner in which that arm is carried by the wall;

Figure 16 is a fragmentary vertical section taken at right angles to the section of Figure 15, and with intermediate portions broken away to save space, showing from another direction, the manner in which the supporting arm is carried by the cabinet wall;

Figure 17 is a perspective view of the supporting arm for the shelf and one of the lateral members thereof broken off;

Figure 18 is a perspective view, looking at the underside of the top, or bottle supporting shelf, of the cabinet;

Figure 19 is a top plan view of the evaporator employed in my cabinet with the shelf of Figure 18 lying therearound and therebeneath;

Figure 20 is a front elevation of the evaporator with the shelf shown therebeneath in broken lines;

Figure 21 is a side elevation of the evaporator per se;

Figure 22 is a horizontal section taken on lines 22—22 of Figure 20;

Figure 23 is a horizontal section taken on lines 23—23 of Figure 20;

Figure 24 is an enlarged fragmentary vertical section taken on line 24—24 of Figure 23;

Figure 25 is a perspective view of a large storage tray for the evaporator, and;

Figure 26 is a similar view of a smaller ice tray.

Figure 1:
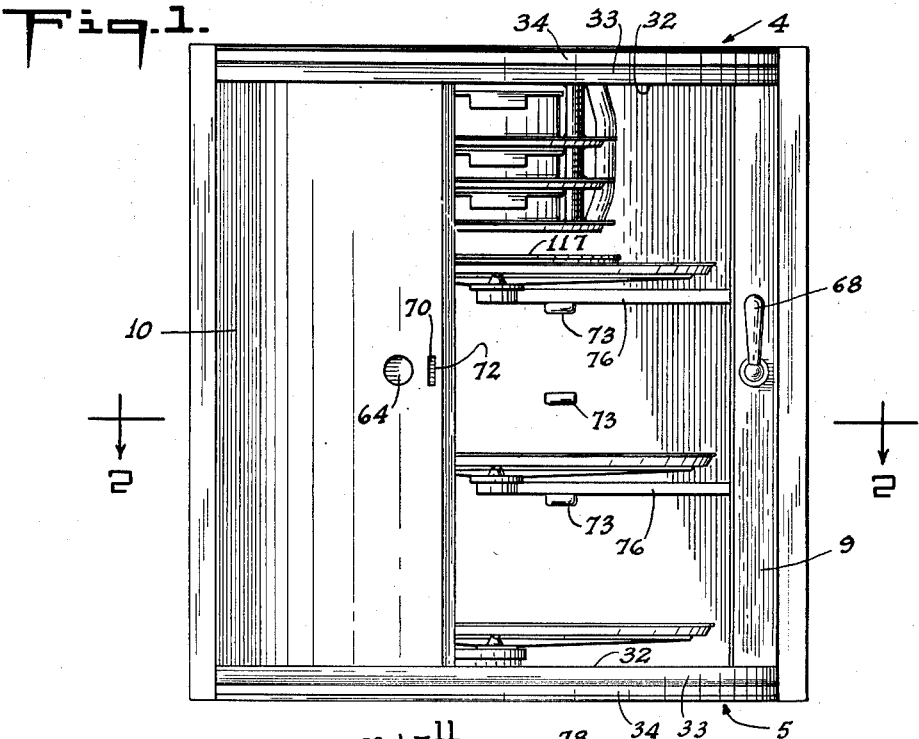
Figure 1 is a front elevation of the cabinet of my invention, showing the door thereof in partly opened position.

Referring to the drawings in detail, the insulated cabinet of Figure 1 is depicted as a refrigerator, though, of course, it can be readily appreciated that many of the aspects of its construction and equipment are applicable to insulated cabinets generally. Being generally cylindrical in shape, the cabinet has a principal cylindrical wall portion generally shown at 1, forming less than a complete cylinder to provide for an opening as generally shown at 2. The opening 2 is arranged to be closed by a door generally shown at 3. The door 3 also forms a portion of the cylinder on a smaller diameter than, but concentric with, and co-axially mounted with respect to the cylinder of the wall portion 1. The door is, of course, of sufficient length to close the opening 2. The ends of the cabinet are interchangeable circular members of identical construction, but will, for the sake of convenience, be referred to as top and bottom. Thus, the cabinet as shown is furnished with a top generally shown at 4, and a bottom generally shown at 5.

Figure 2:
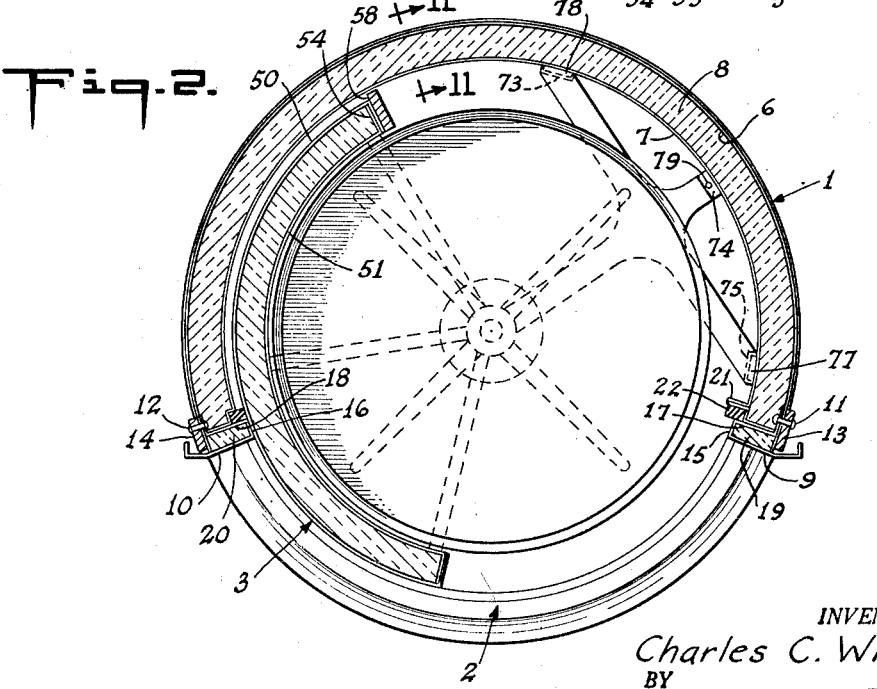
Figure 2 is a horizontal section thereof taken on lines 2—2 of Figure 1.

By referring to Figure 2, it will be seen that the wall or body portion 1 is actually constructed of concentric shells 6 and 7, which are spaced apart to permit the reception therebetween of some suitable form of insulation; here illustrated at 8 as of the mass type. Any suitable insulation presently available can, of course, be employed without departing from the spirit and scope of the invention. The ends of the chamber formed by the shells 6 and 7 must, of course, be closed off in order to complete the construction and retain the insulation in place. The outer shell 6 merely follows its normal cylindrical shape, and terminates against the finishing members 9 and 10, located respectively at the right and left sides of the opening 2, as the same is viewed in Figures 1 and 2. Just back of its engagement with the members 9 and 10, however, the shell 6 is caught by rivets 11 and 12. These rivets hold the ends of the shell against vertical stiffener members 13 and 14, which extend throughout substantially the entire height of the cabinet.

The finishing members 9 and 10 extend inward from their engagement with the ends of the shell 6 and, as best shown in Figures 4 and 5, continue inward beyond the inner surface of the inner shell 7. They then turn laterally for a short distance as shown at 15 and 16 (Figure 2), after which they are turned outward again leaving shoulders 17 and 18 extending inward of the shell 7. The members 9 and 10 terminate in laterally extending flanges which are secured by the rivets 11 and 12. In addition to providing the shoulders just mentioned, the elements extend outwardly beyond the cabinet wall for assembly with adjacent cabinets as more fully gone into in my application serial number 593,411, filed May 12, 1945, entitled "Cabinet Assemblies," now Patent No. 2,521,765. They also form pockets at the ends of the wall which are filled with additional insulation as shown at 19 and 20.

The inner shell 7 is offset inwardly and reversably bent adjacent its right hand end to form a shoulder 21. From thence, it continues to determine the inner end of the shoulder 17 of the member 9, and from there, lies along that member to terminate against the securing flange of the same. In this manner, the end of the chamber formed by the shells is closed.

As seen in Figures 2 and 4, the shoulder 21 and the shoulder 17 form a pocket for the reception of gasket 22 which, along with said shoulders, extends for the full height of the door 3.

The opposite end of the inner shell 7 is formed somewhat differently. Its end corner is depressed to form a shoulder 24 (Figure 5) and border the shoulder 18. From that point it extends to terminate in the same manner as the other end of the shell 7. No means is shown for securing the ends of the shell 7 in place against the finishing members 9 and 10 and, normally, none would be necessary, as the mere engagement of the ends and the members will suffice. Nevertheless, it is obvious that spot welds, rivets, or the like could be used if desired. At the end just described there is a gasket 25 which, similarly to the gasket 22, extends throughout the full height of the door and is seated in the pocket formed by the shoulders 18 and 24. This gasket 25 does not, however, extend out as far beyond the surface of the shell 7 as does the gasket 22 for reasons which will appear hereinafter.

The substantially identical ends, shown as top 4 and bottom 5, are of double-walled construction, like the side wall 1, and have suitable insulation between the spaced portions of said double wall. The outer one of the spaced wall portions, generally shown at 26, is formed with an upstanding flange around its periphery as best shown in Figures 10 and 11. Where this flange is received between the shells 6 and 7 of the side wall 1, it is of generally rectangular cross section. As shown in Figure 11, the base 27 of the flange is of the proper width to space the side wall numbers 7 and 8 apart, and is employed for that purpose. Thus the upstanding portions 28 and 29 of the flange lie against the inside walls of the shells 6 and 7. In addition, the bottom edge of the portion 29 is curled upwardly as shown at 30, to hold the outer shell 6 in against the flange portion 29.

Beyond the ends of the side wall 1, and where the flange borders the opening 2, it takes on a different formation. This formation as best shown in Figures 1 and 11 is that of an artistic molding whose inner wall 31 extends upwardly to a greater height than the wall 28. It then extends outwardly for a short distance as shown at 32, is curved downwardly in a sweep 33, which carries down to the same height as the base 27, and then extends straight down in a portion 34 the same as the portion 29. By referring to Figures 10 and 11, it can be observed that though the portions 34 and 31 continue the spacing of the portions 28 and 29, the height of the portions 32 and 33 is considerably greater than that of the base 27. Thus, the upstanding molding portions 32 and 33 not only provide an ornamental effect, but where their ends drop down to the height of the base 27 are provided to assist in maintaining the ends of the side wall 1 in place.

The inner portion 35 of the end wall extends upwardly at 36, laterally at 37, and downwardly at 38, to form a peripheral flange which is continuous and of the same shape and height throughout. The downward extending portion 38 not only serves to space the portion 35 from the portion 26, but also is of the proper diameter to maintain the inner side wall shell 7 against the flange 28.

As already mentioned, suitable insulation 39 is applied throughout most of the space between the inner and outer wall portions 26 and 35. The center portion of the ends 4 and 5, however, carries the mounting plate 40 for the pivotal receiving member shown in Figures 13 and 14. This plate, as shown in Figure 13, is received within the space between the end wall portions 26 and 35 and lies against the inner surface of the portion 35. The remainder of the space between the portions 26 and 35 is filled with wood, or similar rigid material, 41 to lend stability to the structure, rather than continuing the insulation 39 in the space.

The plate 40, as shown, is circular though such shape is not essential. It is, however, essential that the center of the plate, no matter what its shape, be located on the axis of the cabinet, in order to give the construction the stability that is needed since various elements of the cabinet are carried by the plate. Thus, one face of the plate is provided with a centrally located upstanding boss 42, which extends through the wall portion 35 to protrude a short distance into the cabinet. An axial tube 43 of smaller diameter than the boss also extends from the free face of the boss and causes a shoulder 44 to be formed on the boss around the tube. Finally, as is readily apparent from Figures 13 and 14 the tube 43, boss 42, and plate 40 are provided with an axle bore 45, which in the instance shown, is formed with a screw thread.

Though the supporting plate with its boss and tube just described are shown as applied to the upper end wall of the cabinet and thus extend downwardly into the cabinet, it is to be understood that the same condition applies though in reverse at the bottom of the cabinet. The only difference between this aspect of the top and bottom constructions is that in the upper member the bore 45 is screw threaded in order to carry the evaporator, as will appear hereinafter, whereas the bore of the bottom member is left with a smooth surface to facilitate the pivotal mounting of a shelf therein.

Considering now the door of the refrigerator and the operation of the same, it is seen from Figure 8 that identical top and bottom mountings are employed. These, as shown in the fragment in Figure 12 are, in effect, spiders consisting of collars 46 from which radial arms 47, 48, and 49 extend to the ends and center of the door as shown in Figure 8. The collars 46 form a bearing fit on the tubes 43 and ride on the same. Hence, by providing this combination of elements at each end of the cabinet, the door can be mounted for accurate swinging movement about the axis of the cabinet.

The door, like the side wall 1 of the cabinet, consists of outer and inner wall portions 50 and 51 forming sections of concentric cylinders spaced apart to receive suitable insulation material 52 therebetween. The ends of the door, at 53 and 54, are closed in some suitable fashion such as by interning and lapping the ends of the portions 50 and 51 as shown on the various figures. Likewise, the top 55 and bottom 56 of the door may be suitably and similarly closed while the arms 47 and 49 have their ends received within the space between the wall portions 50 and 51 at the extreme outside corners of the same. The arms 47 and 49 are suitably secured in such corners while the arms 48 are received and secured in the center position as shown.

The end 53 is merely a straight surface, but the end 54 has a plate 57 applied to it. This plate extends throughout the full height of the end and is of somewhat greater width than that end and is mounted thereon to provide the gasket engaging shoulder 58. It is apparent from the showing in Figures 2 and 5, that the door 3 is of such a size and is so mounted that space is left between its outer portion 50 and the inner shell 7 to accommodate the extension of the shoulder 58. Considering the function performed by the shoulder 58, it is first seen that the front end of the door 53 merely abuts against the gasket 22. This gasket lies across its path and serves as a stop as well as a gasket, but obviously, the same condition can not prevail at the rear end of the door. There the offset shoulder 58 (Figures 3 and 5) engages the gasket 25 which is so mounted as to permit the door to swing by it until it is engaged by the shoulder 58. The gaskets 22 and 25 when engaged by the end 53 and shoulder 58 respectively, and compressed in a manner to be described hereinafter, effectively seal the vertical edges of the door against heat transfer.

In addition to the vertical gasketing of the door, I have devised simple and effective means for gasketing the top and bottom of the door. This comprises pairs of members shown per se in Figure 9. Since the pairs for top and bottom of the door are identical, only one pair need be described and the same reference characters will be given to each.

Each pair of gasketing members consists of a fragment of annulus. One of these is affixed to and coextensive with either the top or bottom of the door as the case may be. This affixed member, as shown at 59 in Figures 8 and 9, is normally made of metal and though its internal curvature 60 coincides with the curvature of the inner door portion 51, its outer curvature is eccentric with respect thereto as shown at 61. This eccentricity is so selected that the member 59 increases regularly in thickness from the forward edge of the door 53 to the rear edge 54.

The complementary member mating with the member 59, indicated at 62, is usually the one of the pair which is made of some resilient compressible material such as rubber. It is designed to be secured against the upstanding wall 36 formed on the inner end portion 35 and its outside curvature accordingly conforms to the curvature of the surface 36. The curvature of its inner surface 63, however, is eccentric with respect to the curvature 62 and is mated with the surface 61 in such manner that as the door swings into closed position, the surface 61 gradually and uniformly approaches the surface 63. Thus, by properly locating the member 62, the full engagement of the surfaces 61 and 63 can be attained at the time when the end 53 of the door 3 abuts against the vertical gasket 22 which will, of course, be at the same time as the gasket 25 is engaged by the shoulder 58. In this manner, a complete seal is provided around all the edges of the door when the door is merely swung into closed position by hand action. The means for exerting such hand action is shown at the finger grip or handhole 64.

Though the member 59 is indicated as of metal and the member 62 of resilient gasketing material it is, of course, to be understood that this condition can be reversed if desired. It is, however, advantageous to have the member secured to the cabinet end as the resilient one, or the one more likely to wear, since the member in this position can be more readily removed and replaced than can the one carried by the door.

Though the hand type closing of the refrigerator door just described would be as effective as necessary during the opening and closing of a refrigerator while a meal is in preparation, I have provided additional means for sealing the door up tight during such times as the refrigerator is not in use.

This means comprises a cam like member generally shown at 65 in Figures 6 and 7, which member is swung on a pin or shaft 66, journaled in suitable position in the member 9 and terminating at its opposite end in a body member 67. The body member 67, as shown, presents a broad bearing face against the member 9 and is furnished with an operating handle 68, extending at right angles therefrom.

The door 3, adjacent its end 53, is equipped with a block 69 slotted at 70 in line to receive the leading edge of the cam 65. The cam 65 is inclined as shown at 71 on its outer face in such manner that when the handle 68 is moved from the vertical position shown in Figure 1 toward the horizontal position shown in Figures 3 and 4, the surface 71 acts against the inner vertical side wall 72 (Figure 1) of the block 70. This action drives that block and the door in the direction of the incline of the cam surface 71 and thus moves the door further in the closing direction. This movement acts to compress the gaskets 22 and 25 as well as the gaskets 62 at the top and bottom of the door and thus effects an extremely tight seal all around the door. It is, of course, to be understood that this additional closing operation is not contemplated at every opening and closing of the refrigerator door, since it would be a nuisance to have to do so at each of the times that one goes to the refrigerator in the course of preparing a meal. When, however, the meal has been completed and everything has been put away in the refrigerator, its door can be sealed up tight, without slamming and without physical exertion, by merely operating the handle 68.

The manner of adjustably supporting the intermediate shelves in my cabinet is shown in Figures 15, 16, and 17. To some extent, this corresponds to the cantilever type of shelf supporting shown in my application entitled, "Cabinet Structures," bearing Serial #583,370, filed March 17, 1945. It is simplified over that construction, however, to the extent that no separate supporting members need to be applied to the wall. Instead, the inner shell 7 has integral projections such as 73, 74, and 75 struck inwardly therefrom. These mount the shelf supporting arm 76; receiving its ends 77, 78 and its pin 79 in the cantilever arrangement described in said application Serial #583,370 just referred to. It is, of course, understood that the supporting arm 76 can be mounted in several vertical positions on the wall 7 since a series of projections such as 73, 74 and 75 is provided. Thus, one or more shelves may be adjustably mounted within the cabinet.

The inner end of the supporting arm 76 is furnished with a mounting for rotatably receiving a shelf shown generally at 80. This incorporates a pivotal socket 81 and a supporting shoulder 82 therearound. Thus, a shelf as shown at 83 in Figure 15 may be detachably mounted therein by inserting its pivotal projection 84 in the socket 81. The shoulder 82 will accordingly serve by engaging the bottom of the shelf spider 85 at 86 to prevent the shelf from rocking. Nevertheless, the shelf can be lifted from its arm 76 if desired, or the arm 76 with the shelf still on it may readily be disengaged from the wall and shifted to a different vertical position if desired.

A special form of shelf is shown in Figure 18. This is an annulus, having a base 87 and upstanding outer and inner walls 88 and 89. This shelf is mounted on the same type of spider employed for mounting full shelves, as shown at 85, and the spider, of course, is arranged with a pivot 84 and a steadying surface 86, so that the annular shelf can be carried by a supporting arm 76 the same as any other shelf. This particular shelf, however, is employed as the topmost one in the cabinet and is the one commonly used for carrying bottles. In prior art refrigerators, the bottles are carried on narrow shelves at the sides of the evaporator, but the instant construction makes better utilization of the space and at the same time, renders the bottles more accessible. For full appreciation of this feature, attention is directed to Figure 1, 19, and 20. From this showing, it is seen that the evaporator, generally shown at 90, is of cylindrical formation, is mounted axially with respect to cabinet, and is of substantially the same diameter as the inner wall 89 of the annular shelf 87. Inasmuch as the outer edge 88 of the annulus 87 lies inside of the cylindrical path travelled by the inner wall portion 51 of the door, then obviously bottles carried by the shelf 87 can be rotated all the way around the evaporator. This not only renders all the bottles more accessible than has heretofore been the case, but also permits the storage of a greater number of them since they may be stored in back and front, as well as alongside, the evaporator.

Considering the construction of the evaporator per se, it is seen to be of the dole plate type. As shown, it has a top plate 91, a bottom plate 92, and intermediate horizontal partition plates 93 and 94. These are joined together on the left-hand side by a vertical strap-like member 95, and on the other side by the piping employed to pass the coolant between the plates.

The evaporator is carried solely by a screw-threaded center stud 96 which is received in the screw-threaded bore 45 extending from the plate 40. This is all the support it needs and by supporting it thus, the space employed for this purpose is reduced to a minimum.

The piping to carry the coolant to, from, and through the evaporator is likewise entirely unobtrusive. It consists of inlet and outlet pipes 97 and 98, which are secured between leaves of the upper dole plate 91 by welding or the like and engage the same at a position in its circumference, which is beyond the travel of the door 3. Accordingly, the pipes 97 and 98 are out of the way of the door as well as being up close to the top of the cabinet where they are also out of the way of the contents of the cabinet.

The inlet pipe 97 communicates through a track 99 in the upper plate 91 with a vertical pipe 100 extending down the right-hand side of the evaporator to communicate with the path 101 in the bottom plate 92. In doing so, the pipe 100 is secured to each of the intermediate plates 93 and 94 and thus serves as a side brace comparable to the strap 95 on the left side of the evaporator. The coolant is returned from plate to plate by the intermediate pipes 102, 103, and 104 which, of course, serve to additionally strengthen the construction of the evaporator. The pipe 104 terminates in a path 105 which returns back and forth across the upper plate 91 and communicates with the outlet pipe 98.

Though dole plate construction in general is not new, it is believed that the particular application here disclosed has not heretofore been contemplated. The precise construction of an actual plate is shown in Figure 24 which depicts a fragmentary section of the bottom plate 92. From this, it will be seen that such plate is actually made from two leaves or sections 106 and 107. The track 101 for the coolant is formed by the depressing or embossing of the leaf 107 as shown at 108, while the leaves are secured together adjacent their outer edges and intermediate the track portions by welding, or in some other suitable manner.

In spite of the fact that the evaporator is cylindrical, it is nevertheless capable of accommodating trays which carry a substantial capacity as contrasted with prior constructions. These are all of an odd shape being portions cut out of the circle of the evaporator. The largest or storage tray is shown at 109 in Figure 25. Its front and back walls 110 and 111 form portions of the circle of the evaporator, while its side walls 112 and 113 are straight. Its front wall is equipped with the customary draw pull 114. One of the ice cube trays is shown at 115 in Figure 26. It is shaped similarly to the tray shown in Figure 25, differing therefrom merely in depth. The tray 115 carries a separator member 116 which, though it produces some odd shaped pieces of ice, particularly at the front wall, nevertheless enables a considerable number of cube shaped members to be formed. It is not believed necessary to go into any further detail on this element.

A tray 117 for catching liquid during defrosting is appropriately located beneath the evaporator and is carried on the arms of the spider 85. It is so dimensioned so as to lie within the inner edge 89 of the annulus 87, and need merely be lifted up to be removed.

It is believed that in the course of describing the construction of the invention, sufficient has been said concerning the operation thereof to render the same readily understandable to anyone skilled in the art. It is, of course, to be understood that the construction shown is merely illustrative of the invention and is not to be considered as limiting the scope of the same beyond any limitations which may be imposed by the disclosures of the prior art.

Having disclosed my invention, what I claim as new and desire to secure by Letters Patent, is:

1. In cabinet construction, a side wall forming part of a cylinder and comprising spaced concentric side wall members, said side wall members terminating at vertical edges to provide an opening, a circular end member for closing an end of said side wall, said end member including an annular portion extending upwardly between said side wall members and engaging the same to assist in maintaining the same in spaced relation, and a second portion annularly co-extensive with said first portion and extending entirely across said opening, but extending upwardly above the level of said first portion to form a stop shoulder at each end thereof, one of said stop shoulders engaging one of the edges of said cylindrical wall at said opening and the other of said stop shoulders engaging the other of said edges of said cylindrical wall to assist in maintaining said edges in fixed position.

2. In cabinet construction, a side wall forming part of a cylinder and comprising spaced concentric side wall members, said side wall members terminating at vertical edges to provide an opening, a circular end member for closing an end of said side wall, said end member being formed with an integral annular portion extending upwardly therefrom, one part of said annular portion extending entirely across said opening and terminating in downturned portions to form stop shoulders, one of said stop shoulders engaging each of said edges of said cylindrical wall and the remaining part of said annular portion continuing on a lower level from that of the first part thereof, said remaining part extending upwardly between said side wall members and engaging the same to assist in maintaining the same in spaced relation.

CHARLES C. WHITE.

REFERENCES CITED

The following references are of record in the file of this patent:

UNITED STATES PATENTS

| Number | Name | Date |
|---|---|---|
| 409,035 | Graf | Aug. 13, 1899 |
| 1,311,159 | Freer | July 29, 1919 |
| 1,320,882 | Maehler | Nov. 4, 1919 |
| 1,799,744 | Gruber | Apr. 7, 1931 |
| 1,927,255 | Brown | Sept. 19, 1933 |
| 1,935,003 | White | Nov. 14, 1933 |
| 1,963,089 | Henderson | June 19, 1934 |
| 1,973,880 | Moody | Sept. 18, 1934 |
| 2,035,226 | Forsthoefel | Mar. 24, 1936 |
| 2,051,271 | Passmore | Aug. 18, 1936 |
| 2,053,803 | Schweller | Sept. 8, 1936 |
| 2,120,167 | Waream | June 7, 1938 |
| 2,301,657 | Hlavaty | Nov. 10, 1942 |
| 2,303,126 | Koppel | Nov. 24, 1942 |
| 2,347,985 | Beersman | May 2, 1944 |

FOREIGN PATENTS

| Number | Country | Date |
|---|---|---|
| 467,219 | Germany | Oct. 22, 1928 |